Figure 1:
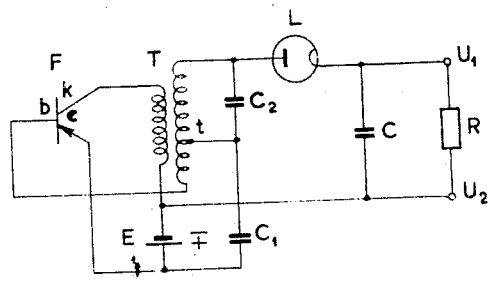

April 7, 1959    B. KRÜGER    2,881,380
VOLTAGE CONVERTER
Filed Oct. 15, 1956

INVENTOR
BODO KRUGER
BY Ferd. M. Vogel
AGENT

United States Patent Office 2,881,380
Patented Apr. 7, 1959

2,881,380

VOLTAGE CONVERTER

Bodo Krüger, Stockholm, Sweden, assignor, by mesne assignments, to North American Philips Company, Inc., New York, N.Y., a corporation of Delaware Application October 15, 1956, Serial No. 615,883

Claims priority, application Sweden October 15, 1955

4 Claims. (Cl. 321—2)

The invention relates to a voltage converter comprising an oscillator with a junction transistor which is alternately in its conducting and in its non-conducting state, a source of supply voltage, a transformer, the primary winding of which is connected in series with said source of supply voltage between the emitter and the collector of the transistor whilst its secondary winding is coupled to the emitter-base path of the transistor to sustain oscillations, a rectifier connected to apply said oscillations to a load to produce a higher voltage across said load and a smoothing condenser to suppress alternating currents flowing through the load. Such voltage converters are used for instance to convert the rather low voltage of a battery or an accumulator into a voltage high enough to operate amplifier tubes, electron beam tubes, Geiger-Müller counter tubes or the like.

In known voltage converters of this type difficulties might occur which are explained in detail below and the invention seeks to avoid or to meet these difficulties. It is characterized by means providing that during the conducting state of the transistor the substantially unsmoothed current applied through the rectifier to the load, or a current proportional to this substantially unsmoothed current, is applied to the base of the transistor in a sense to bring the emitter-base junction into its conducting state.

The invention will now be described more in detail with reference to the drawing, showing in Fig. 1 an embodiment of the invention and in Fig. 2 an alternative of Fig. 1.

The voltage converter according to Fig. 1, comprises a source of supply voltage E, an oscillator having a junction transistor F with an emitter-collector current multiplication factor nearly equal to 1, a transformer T, a rectifier L in form of a diode and a smoothing condenser C. The collector electrode $k$ and the emitter electrode $e$ of the transistor are interconnected through the primary winding of the transformer in series with the supply source E. The secondary winding of the transformer T is coupled to the emitter-base path of the transistor F in order to sustain oscillations of such a kind that the transistor is alternately in its conducting and in its non-conducting state. The output terminals of the D.C. voltage transformer are denoted $U_1$ and $U_2$ and a load resistance R is connected between them. The rectifier L rectifies the voltage of the oscillations generated across the transformer T and produces a higher voltage across the load R as compared to the voltage of the source E. The smoothing condensor C across the load R suppresses alternating currents flowing through said load.

In a known D.C. converter, loading current is applied through the rectifier L to the load R during the non-conducting interval of transistor F. By making this interval rather short compared with the conducting interval of the transistor, large voltage pulses are produced across the transformer T. This involves however, the disadvantage that the transformer T has to store a large amount of magnetic energy during the conducting interval of the transistor F which has suddenly to be transferred to the load R during said non-conducting interval due to which rather large magnetic losses occur in said transformer T. Furthermore, if the load resistance R varies, additional means have to be provided to stabilize the voltage across the load.

Also the self starting of such known D.C. converters is often a real problem. In a D.C. voltage transformer, the oscillator, when starting, is also heavily loaded by the uncharged smoothing condenser, for which reason special starting methods often must be applied. Furthermore, a transistor is a power amplifier, which means that in case of a strong feedback the oscillator can deliver only a limited output. Therefore, when a short overload occurs, the oscillator stops oscillating and because of the bias voltage of the base, the losses of the collector become so large that the transistor is soon destroyed. The invention seeks to solve these problems and has inter alia the property that it offers an excellent efficiency and a nearly constant voltage across the load even if the load admittance $1/R$ is varied from its full value to for instance two tenths of this value. According to the invention, the base of the transistor is fed back with the unsmoothed or at least nearly unsmoothed rectified loading current in a sense to bring the emitter base junction into its conducting state. To this end, as shown in Figure 1, the secondary winding of the transformer T forms with the rectifier L, the load R and the emitter-base path of the transistor a closed loop wherein the rectifier L has the same pass-through direction as the emitter-base path. Consequently the feed-back current through the emitter-base-junction increases with decreasing load resistance R and vice versa involving an automatic adjustment of the feed-back power to a value necessary for sustaining oscillations and facilitating self-starting at different loads without undue feed-back power losses. The oscillator keeps oscillating and starts reliably even when the terminals $U_1$ and $U_2$ are short-circuited.

In this respect it is worthwhile to note that a smoothing condenser, such as C in the figure has the effect—contrary to the prior art—not to load but even to relieve the load during the starting interval of the transistor thus increasing the tendency to start oscillating. The transistor and the rectifier are simultaneously conducting so that the balance of the ampere turns in the transformer is maintained. Thereby direct current magnetization by the load to current is avoided. The transformed energy is thus not accumulated as magnetic energy from one half period to the other one.

The collector current pulses are almost rectangular, whereby it is possible to obtain the largest possible effect from a given type of transistor.

Furthermore the transistor is provided in a known manner with a second regenerative feed back by means of a voltage substantially independent of the magnitude of the load, which voltage is obtained by means of inductive voltage division in the secondary winding of the transformer. To this end one terminal of the secondary winding is directly connected to the base $b$ and the tap $t$ on this secondary winding is connected through condenser $C_1$ to the emitter $e$ of the transistor F. This measure is taken in order to have a sufficient large blocking voltage on the base $b$ during the non-conducting interval of the transistor T in order to suppress undesired leakage current through the transistor during this interval and to render the transition from the blocked to the current-carrying interval as short as possible.

Accordingly the condenser $C_1$ has to have a low impedance for this blocking voltage as compared to the transistor input impedance when the emitter-base-junction is operated in its reversed direction and the reverse resistance of the rectifier L. On the other hand impedance of the condenser $C_1$ has to be large enough as compared to the resistance of the rectifier L in its high conducting state to avoid undesired smoothing of the loading current flowing through the rectifier L. Since, in practice, the former resistance is of the order of several hundred K ohms and the latter only of several ohms this condition can easily be fulfilled.

In a practical embodiment for instance $C_1=220$ µµf. at an oscillator frequency of 9-15 kc./s., the transistor is of the type OC72, the transformer has 77 primary turns, 800 secondary turns between the tap $t$ and the upper terminal and 14 secondary turns between said tap $t$ and the lower terminal. The rectifier L is of the type 1N93. Condenser $C=1$ µf. Condenser $C_2$, which is inserted to decrease the peak voltage across the rectifier L during the blocking interval of the transistor, may have a value 48 µµf. The load resistance R may vary from 25K to an infinite value. With a supply voltage of source $E=10.5$ v. the voltage produced across said load R varies only from 102.5 v. to 114 v. The load resistance R itself acts to prevent an overload of the transistor. In order to secure the transistor against overload in the case of short-circuiting of terminals $U_1$—$U_2$ a fuse can be inserted elsewhere in the loop comprising $e$—$b$, secondary of T, L, R—C and E.

Figure 2:
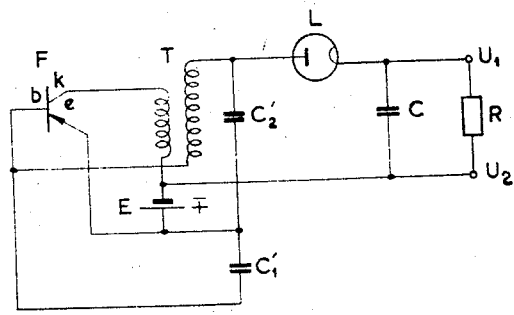

In the embodiment of Fig. 2 a capacitive voltage-division of the voltage across the secondary winding of the transformer T is provided. The voltage divider consists of condensers $C_1'$ and $C_2'$, the former being again larger than the latter, e.g. the ratio may be of the order 1:10.

It will be self explanatory that the circuit elements in the closed loops might be interchanged. Thus the supply source E may be inserted in the conductor between the collector $k$ and the upper terminal of the primary of transformer T. Also rectifier L may be interchanged with the parallel connection of the load R and the smoothing condenser C or with the upper part of the secondary winding of transformer T in its parallel circuit with condenser $C_2$. Furthermore the unsmoothed rectified loading current may be amplified by an additional transistor which is connected between the secondary winding and the base electrode of the transistor F. If desired an additional separating transformer may be included between the series branch of rectifier L and decoupled load R—C on one hand and the emitter-base input of the transistor on the other hand. Also additional rectification may be introduced during the negative going pulses at the upper terminal of the secondary winding. Also the oscillator alone might have suitable applications. These variations are given merely by way of example and may offer, separately or in combination, a suitable solution under particular conditions.

It is to be understood, of course, that the quantitative data given above is given only to enable ready practice of the invention and is not intended in any way to limit its scope, which scope is set forth in the following claims.

What is claimed is:

1. A voltage converter arrangement including: an oscillator comprising a junction transistor having emitter, base and collector electrodes, an input circuit connected between said base and emitter electrodes, a source of supply voltage, a transformer having a primary winding and a secondary winding, said source and said primary winding being connected in series between said emitter and collector electrodes, said secondary winding being coupled to said input circuit in regenerative feedback relationship to sustain oscillations, whereby said transistor is alternately in a conducting and a non-conducting state, a load circuit, rectifying means connected to said oscillator to apply said oscillations to said load circuit thereby producing across said load circuit a voltage higher than said supply voltage, a smoothing condenser connected across said load circuit to smooth the current supplied to said load circuit through said rectifying means, and means for supplying to the base electrode of the transistor, during the conducting time intervals of the transistor, a forward current comprising at least a portion of the substantially unsmoothed current supplied to the load through said rectifying means.

2. A voltage converter arrangement according to claim 1, wherein said means for supplying a forward current constitutes a closed circuit loop comprising the emitter-base path of the transistor, said secondary winding, said rectifying means and said load circuit, said rectifying means having the same pass direction as said emitter-base path.

3. A voltage converter arrangement according to claim 1, further comprising a voltage divider connected across said secondary winding and a second condenser connected between said voltage divider and said input circuit, said capacitor supplying a reverse bias voltage to said input circuit when said transistor is in its non-conducting state.

4. A voltage converter arrangement according to claim 2, further comprising a voltage divider connected across said secondary winding and a second condenser connected between said voltage divider and said input circuit, said capacitor supplying a reverse bias voltage to said input circuit when said transistor is in its non-conducting state.

References Cited in the file of this patent
UNITED STATES PATENTS

| | | |
|---|---|---|
| 2,780,767 | Janssen | Feb. 5, 1957 |
| 2,791,739 | Light | May 7, 1957 |